J. A. OBOLE.
MICROMETER ATTACHMENT.
APPLICATION FILED JUNE 2, 1920.
1,416,573.
Patented May 16, 1922.
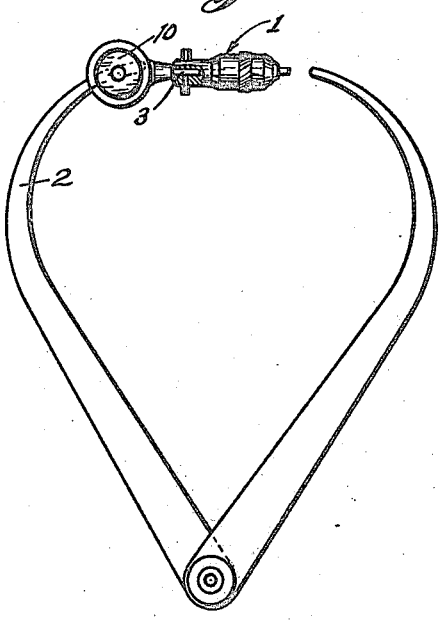
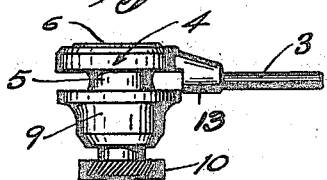
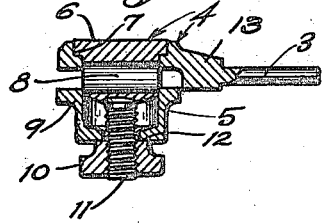
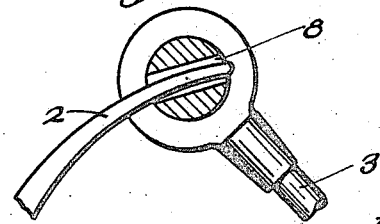
JAMES A. OBOLE.
INVENTOR.
BY
ATTORNEYS.

UNITED STATES PATENT OFFICE.

JAMES A. OBOLE, OF TORRANCE, CALIFORNIA.

MICROMETER ATTACHMENT.

1,416,573.  Specification of Letters Patent.  Patented May 16, 1922.

Application filed June 2, 1920. Serial No. 385,989.

*To all whom it may concern:*

Be it known that I, JAMES A. OBOLE, a citizen of the United States, residing at Torrance, in the county of Los Angeles and State of California, have invented new and useful Improvements in Micrometer Attachments, of which the following is a specification.

This invention is a micrometer attachment adapted to provide means for attaching a micrometer to one of the arms of calipers and the like.

The invention will be readily understood from the following description of the accompanying drawings, in which—

Figure 1 is a side elevation of a pair of calipers having a micrometer attached to one of the arms thereof by the improved attachment.

Fig. 2 is an edge view of the calipers with the micrometer attachment secured thereto.

Fig. 3 is an edge view of the micrometer attachment.

Fig. 4 is a longitudinal section through the same.

Fig. 5 is a transverse section through the micrometer attachment showing the latter mounted upon an arm of a pair of calipers.

The improved attachment is arranged to secure a usual micrometer 1 upon the end of an arm 2 of a pair of calipers. The attachment is shown as comprising a shank 3 projecting laterally from a clamping head 4 shown as an annular collar. A clamping rod 5 is received through the collar 4 with the enlarged head 6 of the rod countersunk in a groove 7 provided upon the collar 4. The clamping rod is provided with a lateral opening 8 arranged to receive the end of the caliper arm 2, said opening being so positioned in the clamping rod that the caliper arm received therethrough will rest against the collar 4. A clamping collar 9 is slidable upon the clamping rod 5 so as to engage the opposite surface of the caliper arm for clamping the latter between collars 9 and 4.

The means provided for adjusting collar 9 into clamping position may comprise a nut 10 threaded on to a bolt 11 projecting longitudinally beyond clamping rod 5, this nut being provided with a shoulder 12 arranged to engage the collar 9. The shank 3 at its junction with clamping collar 4 is, preferably, enlarged as shown at 13 so as to overlie the edge of collar 9 and thereby guide the clamping collars relative to one another.

In the form of the invention illustrated, I have shown the shank 3 of the attachment as a straight shank adapted to be received within the usual socket provided in micrometers of standard make, the usual set screw provided upon the micrometers being adapted to clamp shank 3 within said socket. It will be apparent however that the improved attachment may be adapted to engage any other type of micrometer, the attaching shank 3 varying according to the type of attaching means provided upon the micrometer. Thus, for example, if a threaded attaching socket is provided in the micrometer the shank 3 will be similarly threaded so as to engage the threaded socket.

Various changes may be made without departing from the spirit of the invention as claimed.

What is claimed is:

1. A micrometer attachment comprising a clamping annulus having a shank projecting therefrom and arranged to have a micrometer mounted thereon, a clamping rod having said clamping annulus journaled thereon and adapted to engage an instrument arm, and a second clamping member adjustable along said clamping rod for clamping the micrometer attachment in pivotally adjusted positions with relation to the instrument arm.

2. A micrometer attachment comprising a clamping member having a shank projecting therefrom and arranged to have a micrometer mounted thereon, a clamping rod projecting from said clamping member and having an opening therethrough arranged to receive an instrument arm, and a second clamping member adjustable along said clamping rod for clamping an instrument arm between said clamping members.

3. A micrometer attachment for calipers comprising a pair of cooperating clamping members, one of which is perforated to receive the end portion of a caliper arm, a micrometer receiving member rotatively mounted upon the perforated member and arranged to be retained in fixed position when the cooperating members are clamped upon a caliper arm.

4. A micrometer attachment for calipers comprising a pair of cooperating members, one of which is perforated to receive the end portion of a caliper arm, a micrometer receiving member rotatively mounted upon said perforated member, a threaded shank projecting from said perforated member through an aperture in the companion member, and a nut seated on said threaded shank for drawing the cooperating members into clamping engagement with a caliper arm.

In testimony whereof I have signed my name to this specification.

JAS. A. OBOLE.